United States Patent [19]
Liu et al.

[11] Patent Number: 6,081,517
[45] Date of Patent: Jun. 27, 2000

[54] DIGITAL SUBSCRIBER LOOP ACCESS CIRCUIT FOR DIGITAL SWITCH AND PACKET NETWORK INTERCONNECTIONS

[75] Inventors: Ming-Kang Liu, Cupertino; Steve Chen, San Jose, both of Calif.

[73] Assignee: Integrated Telecom Express, Inc., Santa Clara, Calif.

[21] Appl. No.: 08/934,840

[22] Filed: Sep. 22, 1997

[51] Int. Cl.⁷ .............................. H04L 12/28; H04J 3/16
[52] U.S. Cl. .............................. 370/352; 370/468
[58] Field of Search ..................... 370/351, 352, 370/353, 354, 355, 356, 401, 410, 422, 437, 465, 468, 524, 238, 232, 233, 395; 395/200.01, 200.6, 200.63, 200.81, 500

[56] References Cited

U.S. PATENT DOCUMENTS

| | | | |
|---|---|---|---|
| 4,736,364 | 4/1988 | Basso et al. | 370/68.1 |
| 4,985,891 | 1/1991 | Fujiwara et al. | 370/110.1 |
| 5,375,124 | 12/1994 | D'Ambrogio et al. | 370/110.1 |
| 5,459,722 | 10/1995 | Sherif | 370/395 |
| 5,519,689 | 5/1996 | Kim | 370/395 |
| 5,550,802 | 8/1996 | Worsley et al. | 370/13 |
| 5,566,301 | 10/1996 | Koz et al. | 395/200.2 |
| 5,610,910 | 3/1997 | Focsaneanu et al. | 370/351 |
| 5,625,677 | 4/1997 | Feiertag et al. | 370/352 |
| 5,650,994 | 7/1997 | Daley | 370/259 |
| 5,666,487 | 9/1997 | Goodman et al. | 395/200.76 |
| 5,680,325 | 10/1997 | Rohner | 364/514 |
| 5,710,769 | 1/1998 | Anderson et al. | 370/355 |
| 5,764,756 | 6/1998 | Onweller | 370/352 |
| 5,802,045 | 9/1998 | Kos et al. | 370/352 |
| 5,809,286 | 9/1998 | McLain, Jr. et al. | 395/500 |
| 5,812,786 | 9/1998 | Seazholtz et al. | 395/200.63 |
| 5,838,663 | 11/1998 | Elwalid et al. | 370/233 |
| 5,953,338 | 9/1999 | Ma et al. | 370/395 |

*Primary Examiner*—Chau Nguyen
*Assistant Examiner*—Chiho Andrew Lee
*Attorney, Agent, or Firm*—Law +

[57] ABSTRACT

A digital subscriber loop access and multiplexing (DSLAM) circuit for use at a central office site is disclosed. The DSLAM circuit couples to a digital subscriber loop (DSL) and permits a downstream user to set up and configure an end-to-end connection with destination customer promise equipment (CPE) at a target data rate using any one or more of a regular switching telephone network, various kinds of wide area networks, or virtual permanent circuit links via digital cross-connects.

58 Claims, 7 Drawing Sheets

PSTN CALL SETUP

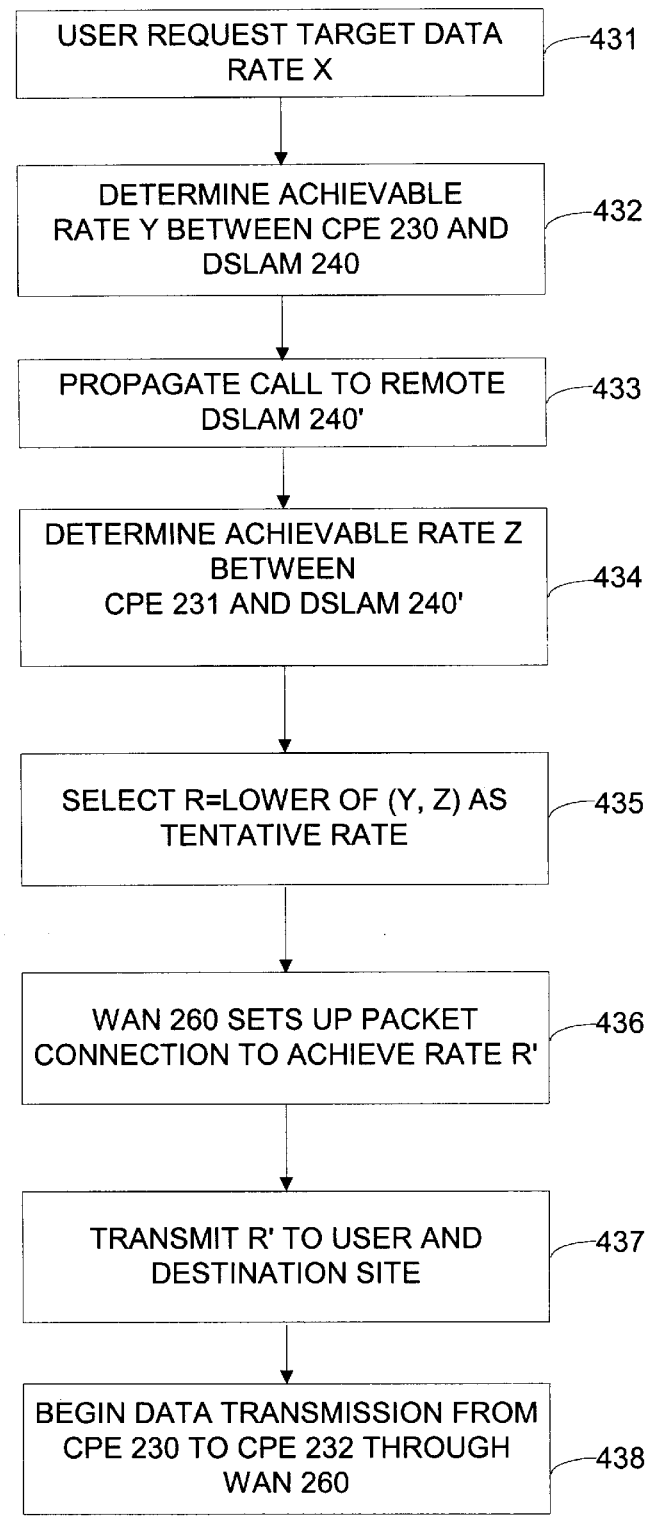

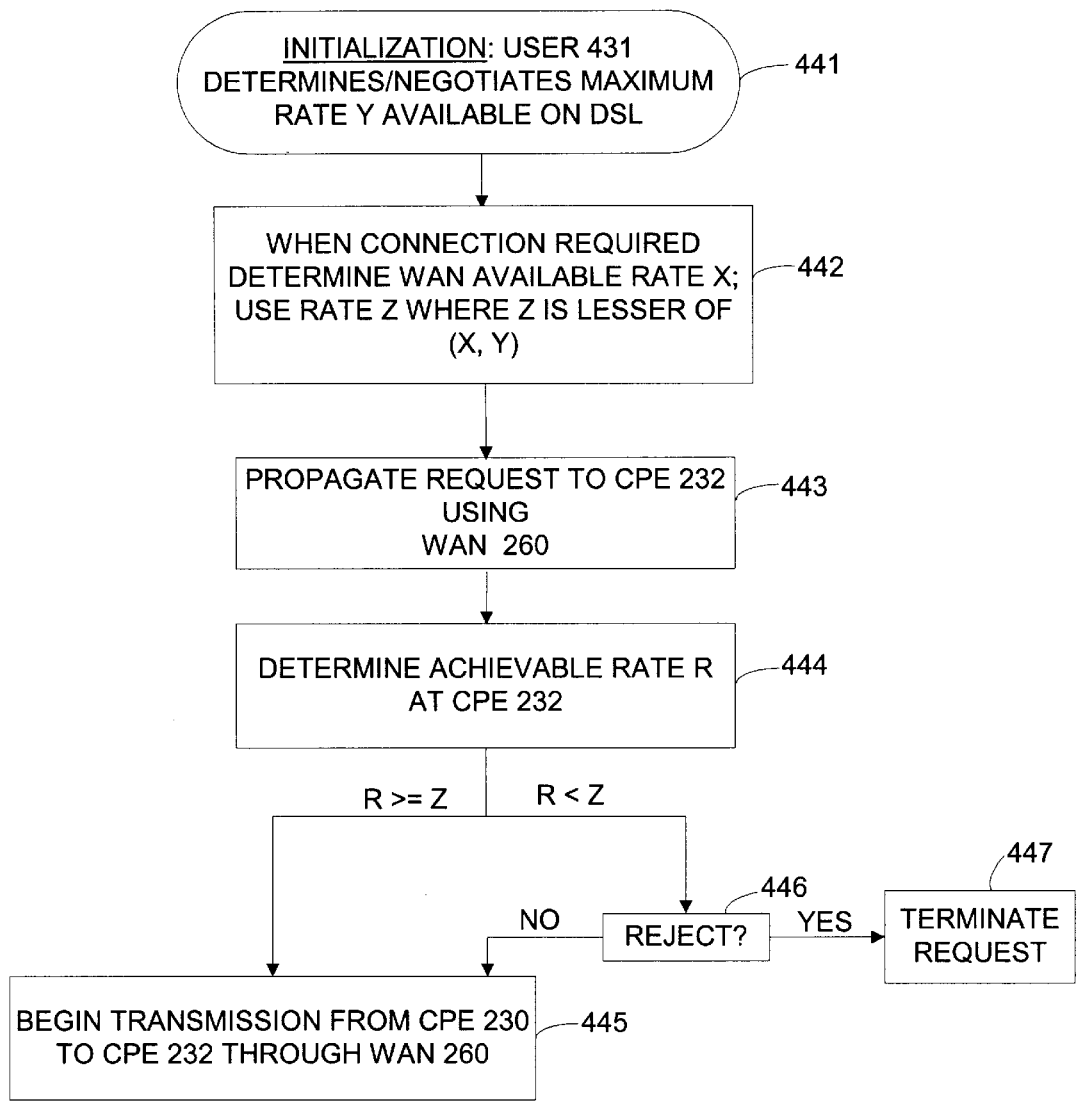

DIGITAL SUBSCRIBER LOOP ACCESS CIRCUIT FOR DIGITAL SWITCH AND PACKET NETWORK INTERCONNECTIONS

CROSS REFERENCE TO RELATED APPLICATIONS

The present application is related to the following additional applications filed concurrently herewith:

Attorney Docket No. ITE 97-013 entitled "Configurable Digital Subscriber Loop Access and End-to-End Data and Analog Voice Connection System."

Attorney Docket No. ITE 97-015 entitled "Access and Setup Process for End-to-End Data and Analog Voice Connections."

FIELD OF THE INVENTION

The invention relates generally to an access and multiplexing circuit for use at a telephone central office sites. In particular, the present invention permits a digital subscriber loop (DSL) user to flexibly configure an end-to-end data path through one or more data routes, including through a regular digital public switching telephone network (PSTN), various kinds of wide area networks (WANs), and virtual permanent circuit links via digital cross-connects (DCS).

BACKGROUND OF THE INVENTION

To provide high bit rate transmission over existing telephone subscriber loops, various modem technologies have been proposed. One of the promising solutions is the Asymmetric Digital Subscriber Loop (ADSL) technology that can provide up to 6.144 Mb/s transmission from the central office to a subscriber (downstream) and up to 640 kb/s transmission from the subscriber to the central office (upstream).

As the DSL technology rapidly advances, there is a strong need for the carrier (i.e. phone companies) to provide cost-effective, end-to-end, and high-speed interconnection. However, as explained below, there are many complex issues arising at both the upstream and downstream sites that make it difficult to develop cost-effective and easy-to-install and use solutions.

First, because of the earlier PCM (pulse code modulation) design where analog voice is digitized at a rate of 64 kb/s, the digital telephone switches installed in the Public Switched Telephone Network (PSTN) currently provide only 64 kb/s end-to-end connections. For example, ISDN is a DSL technology that can provide end-to-end circuit switching at a rate of multiple 64 kb/s. Each 64 kb/s link in ISDN is called a B channel and users who want a circuit connection at a rate higher than 64 kb/s needs to use multiple 64 kb/s links at the same time. In this case, all source signals are digital (voice will be sampled to 64 kb/s at the user site) and transmitted over individual B channels. They can be switched by either a digital PSTN 115 or packet switching backbone network 120 as shown in FIG. 1A. In this case, ISDN has the following limitations: (1) The transmission rate over the ISDN line (i.e., from IDSN Network Terminal 110A to 110B) is fixed and cannot be expanded (e.g. basic rate ISDN is 128 kb/s and primary rate ISDN is 1536 kb/s). For high performance services such as video conferencing or graphic file transfers, this data rate is not useful and/or it takes too long in time to transfer. (2) Voice traffic is carried via 64 kb/s PCM or one B-channel. Compared to a typical basic rate access of 2 B-channels, voice connection consumes a large portion of the total bit rate. (3) The protocol for connection over packet-switching backbone network 120 is standardized and requires the other end to follow the same protocol. For ADSL access where transmission rates are in the order of Mb/s, use of a large number of B channels (i.e., multiple ISDN connections) is practically undesirable due to the cost of multiple fixed switched connections. Furthermore, even though the ADSL transmission rate is high, it may not require a constant transmission rate (as is provided by a typical ISDN direct switched connection) all the time for many practical applications such as Internet access.

To overcome the above problems, packet switching (in contrast to circuit switching) based solutions for xDSL such as ATM and Frame Relay have been proposed. The term "xDSL" generally refers to a superset of various digital subscriber loop technologies, including ADSL, HDSL, etc. In particular, WANs (as used herein, "WAN" refers to any packet-switching based network such as Frame Relay, ATM, or SMDS (Switched Megabit Data Service)) can provide packet-switched based connections at variable rates and have been proposed to support xDSL. An example of a WAN arrangement 180 is shown in FIG. 1B. In this arrangement, connections at a rate other than multiple 64 kb/s between two CPEs 130 and 132 can be established through WAN backbone data network 160 at a lower cost due to bandwidth sharing. Because they are very suitable for data transfer, these types of high-speed backbones have been widely used in LAN interconnections as well. However, they do not guarantee fixed transfer delay. Therefore, they are not suitable for time-sensitive services such as video conferencing. In addition, they require non-trivial network access setups. As a result, they are difficult for ordinary users to install and maintain. To terminate an xDSL line 125 and connect it to a WAN 160, a piece of equipment called DSLAM (DSL Access and Multiplexer) 140 is used. As shown in FIG. 1B, a DSLAM splits a subscriber loop 125 to a PSTN 150 for analog voice signals and the WAN 160 for data transmission. As shown, however, the above DSLAM based architecture has the following known limitations. (1) Data transmission always goes through the same backbone data network 160. It is desirable to be able to use the PSTN 150 for switching time-sensitive services. (2) As a result, this type of arrangement does not support end-to-end circuit switching other than Plain Old Telephone Services (POTs), and data communications using voice-band modems. This prohibits the use of the current suggested DSL "modem model" in which end-users at CPE 130 can "dial-up" any remote site 131, 132 with a compatible modem user model. Instead, users need to set up all the necessary network addresses for both the host and intermediate nodes. This can be troublesome for most end users and especially a problem when the network needs to be upgraded (ie. the network is no longer transparent to users). (3) It does not have the ability to split the data signals carried by the xDSL. 125 into two paths: one through the PSTN 150 and one through the WAN 160. The access to the WAN 160 needs to support the maximum xDSL rate. If not, the high-speed transmission over the DSL becomes wasted. On the other hand, the access cost to the WAN for this type of data rate can be expensive. This poses a challenging problem for the carriers to price xDSL access.

Furthermore, the cost of DSL, codecs and access equipment are currently much higher than that of voice-band modems. Therefore, even though the speed is much higher than the current 33.6 kb/s or 56 kb/s, most end-users will not afford to upgrade this new technology. A lower cost alternative is thus desirable that users can spend less initially for a lower speed and upgrade it at a later time as demands increase.

In addition to the equipment cost, xDSL users will have to spend much more for the access to a high-speed backbone network. In contrast to the current case where modem users do not need to pay any additional cost, this poses another barrier for adoption of xDSL technology. Users who subscribe to Frame Relay or T1 access typically need to spend $1,000 or even more every month, a figure which is beyond the means of the majority of potential users of such technology.

A critical need, therefore, exists for a solution that minimizes accesses charges while at the same time allowing carriers to enjoy a reasonable commercial return on their investments in higher end equipment to provide ADSL services. To address this need, a forward compatible and expandable xDSL modem or so-called "SAM" (scaleable ADSL modem) has been proposed as a low cost solution at the end-user side in pending U.S. application Ser. No. 08/884,995 filed Jun. 30, 1997 entitled "Rate Adaptable Modem With Forward Compatible and Expandable Functionality and Method of Operation," also assigned to the present assignee. The invention of that SAM disclosure makes it possible for downstream users to avoid the cost associated with an expensive ADSL modem when they do not need full ADSL transmission rate. In an analogous fashion, it would be attractive and advantageous to extend some of the principles of the above SAM disclosures to the upstream sites. In other words, the central office should be able to effectuate an end-to-end architecture that: (i) permits users to only pay carriers a fee necessary to procure a particular desired target data rate (which may be only a fractional portion of a full ADSL data link); (ii) allows users to establish a particular kind of data link (real-time or delayed); (iii) allows users to accept the lowest cost per unit of bandwidth; or (iv) facilitates a data route which is more suited to particular user's connection model.

SUMMARY OF THE INVENTION

Accordingly, an object of the present invention is to provide an end-to-end architecture and system that permits users to flexibly, transparently, and dynamically configure high-speed connections based on criteria such as their particular data rate needs, associated costs of using various data paths, bandwidth availability, access costs, and suitability to the user's connection model.

Another object of the present invention therefore is to provide an access and multiplexing circuit for use in a central office that permits a user to configure and control an end-to-end connection, including a target data rate, via either the current digital PSTN, a packet-based WAN interconnection, or a digital cross-connect.

A further object of the present invention is therefore to provide a flexible and efficient access and setup process for permitting DSL users to configure and control an end-to-end connection, including a target data rate and connection path via either the digital PSTN, a packet-based WAN interconnection, or a digital cross-connect.

Yet a further object of the present invention is to provide an end-to-end connection that is still nevertheless backwards compatible with existing subscriber loop access protocols and is also forwards compatible with proposed partial DSL bandwidth CPE/ISPs at downstream sites;

Yet another objective is to provide a new DSLAM architecture that allows users to incrementally pay for the access fee according to their speed and service requirements.

The objects of the present invention are effectuated by providing a system that establishes an end-to-end data path connection between a data link requesting site and a destination site based on a data route request provided by a user at the origination site. At the central office site, an interface circuit receives voice, data, and the data route request signals from a digital subscriber loop (DSL) coupled to the user's device at the origination site. A data routing control circuit then evaluates and sets up a data route between the origination site and the destination site using the most optimal data path matching the user's request. This data path can include any one or more of the following: (i) a circuit switched PSTN; and/or (ii) a wide area network (WAN); and/or (iii) a digital cross-connect. Other data paths compatible with a PSTN and WAN are also possible. After the link is established, an access router is then used for routing the user's data through the selected data path.

Each of the various data paths has its transmission characteristics, including among other things, a maximum data rate, transfer delay, cost per unit bandwidth, connection model, etc. In the data route request, the user can specify any requirements for these and similar parameters, and the routing control circuit determines which of the available paths most conforms to such request, thereby effectuating a data path most suited for the user's needs. For example, if a very high speed link is required (in excess of 128 Kbs), a WAN may be selected, so long as the other user defined constraints are met by such data path. This type of data path optionally transfers data using any or all of the following: frame relay, and asynchronous transfer mode (ATM). In determining the data transfer rate of any path, the system also takes into consideration the capabilities of any digital subscriber loops coupled to the various communicating sites, as well as the data processing capabilities available at these sites. For time delay sensitive applications, such as video teleconferencing, a switched network, such as the PSTN may be used instead. This can be achieved by setting up one or more dedicated 64 Kb/s links. Simlarly, if low cost is the most important specified criterion in the request, the system can also dynamically determine and select the data path having the lowest cost per unit of bandwidth at the time of the request.

In a preferred embodiment of this system, the interface circuit also separates the data into voice signals and DSL signals. A pulse code modulation circuit then converts the voice signals into digital voice signals for routing through the switched network. The access router is coupled to all the available data paths, including (i) a circuit switched PSTN; (ii) a wide area network interface circuit; and (iii) a digital cross-connect interface circuit.

An access and setup process is also described for accessing and configuring a variety of optimal end-to-end data path modes, including end-to-end switching through a PSTN, end-to-end switching through a WAN, and through an "always-on" type connection. First, a user initiates a connection and transmits an access request to a local central office. The access request can include information concerning a requested data route, target data rate, user connection model, desired cost for the transmission, etc. At the central office, determination is made concerning whether the access request is related to voice signal transmission or a data signal transmission. Based on the parameters of the request, a data route is configured to accomplish the data transfer. The access request can specify a particular data path, or alternatively, can specify that a DSLAM circuit in the central office should select a particular access mode (i.e., the most optimal data path matching the access request requirements) for transmitting data.

In an embodiment where an end-to-end connection is requested through the PSTN, a data path at a data rate of some multiple of 64 kb/s can be set up for applications, which, for example, require realtime performance. After requesting a data path at a particular target rate requested by the user, an evaluation is made of the line qualities between the CO and the communicating sites to ascertain the target rate. The PSTN then allocates and sets up multiple available 64 kb/s connections to try and satisfy the target rate transmission. Thereafter communications can proceed between the two sites at such rate.

In another embodiment where an end-to-end connection is implemented through a WAN, a data path at a certain target data rate can be set up for applications which require a higher data rate, or as is often the case, a lower cost per unit of bandwidth. As above, after requesting a data path at a particular target rate, an evaluation is made of the line qualities between the CO and the communicating sites to ascertain the target transmission rate. The WAN then allocates and sets up sufficient bandwidths to try and satisfy the maximum target transmission data rate. Thereafter communications can proceed between the two sites at such rate.

In applications where a permanent, "always on" DSL connection exists to the central office, a slightly different process can be used. First, to start the connection (turn it on initially) a negotiations procedure is effectuated which determines the highest achievable rate X available through the DSL connection. A WAN having a particular available rate Y is used for effectuating the end-to-end packet-switching connection (i.e., by Frame Relay or ATM) at a rate which is the lesser of X and Y. In the case where Y is smaller than X, a reduced rate Y is proposed to the origination site, which can accept such proposal, or reject the request. A similar negotiations procedure is effectuated at the destination site to determine the maximum rate achievable by that site's DSL. If both sites confirm the request, an end-to-end connection is established for data transmission.

The architecture of the present system combines current DSLAM functions (ATM and/or Frame Relay accesses) with user-configurable end-to-end circuit switching capability. That is, users can decide the rate and ask for connection via either the current digital PSTN packet-based WAN interconnection, or virtual permanent DCS connections. The choice they make can be based on their particular service requirements and the cost they are willing to pay for such service on a call by call basis. The present invention can be loaded directly on top of preexisting switching network infrastructures, and furthermore, permits carriers to more easily allocate the cost of routing data in a manner proportionate to the service requested by a user. For example, an appropriate cost allocation can now be made for delay-sensitive services that require direct switched connections, as opposed to non-delay sensitive services, such as Internet access, which only require packet switching (or the like) connections. Therefore, it provides a smooth migration for all current modem, ISDN, and LAN users. Furthermore, when used in combination with a SAM type transceiver at the end-user side, it provides a very low-cost, end-to-end solution for users who need only connections at a data rate around several hundred kb/s but want to reserve the option of upgrading to a higher performance standard at a later time.

BRIEF DESCRIPTION OF THE DRAWINGS

FIG. 4C is a flow chart illustrating a call setup process for setting up an end-to-end connection through a packet switching network in accordance with the present disclosure FIG. 4D is a flow chart illustrating a call setup process for setting up an end-to-end connection through an "always on" data channel in accordance with the present disclosure.

DETAILED DESCRIPTION OF THE INVENTION

Architecture of the Present Invention

Figure 1A:
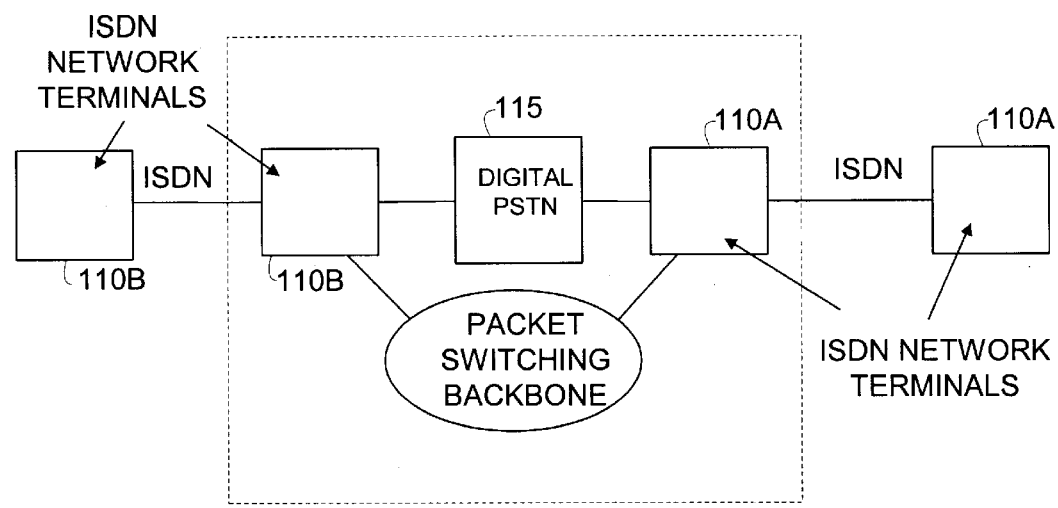
FIG. 1A is a block diagram depiction of a prior art ISDN end-to-end switching network.
Figure 1B:
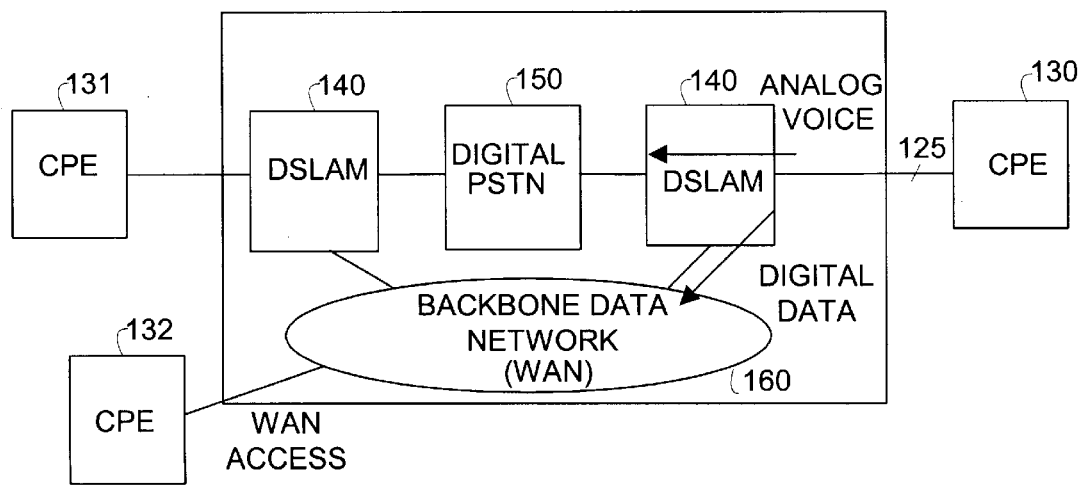
FIG. 1B is a block diagram depiction of a prior art based end-to-end switching network.
Figure 2:
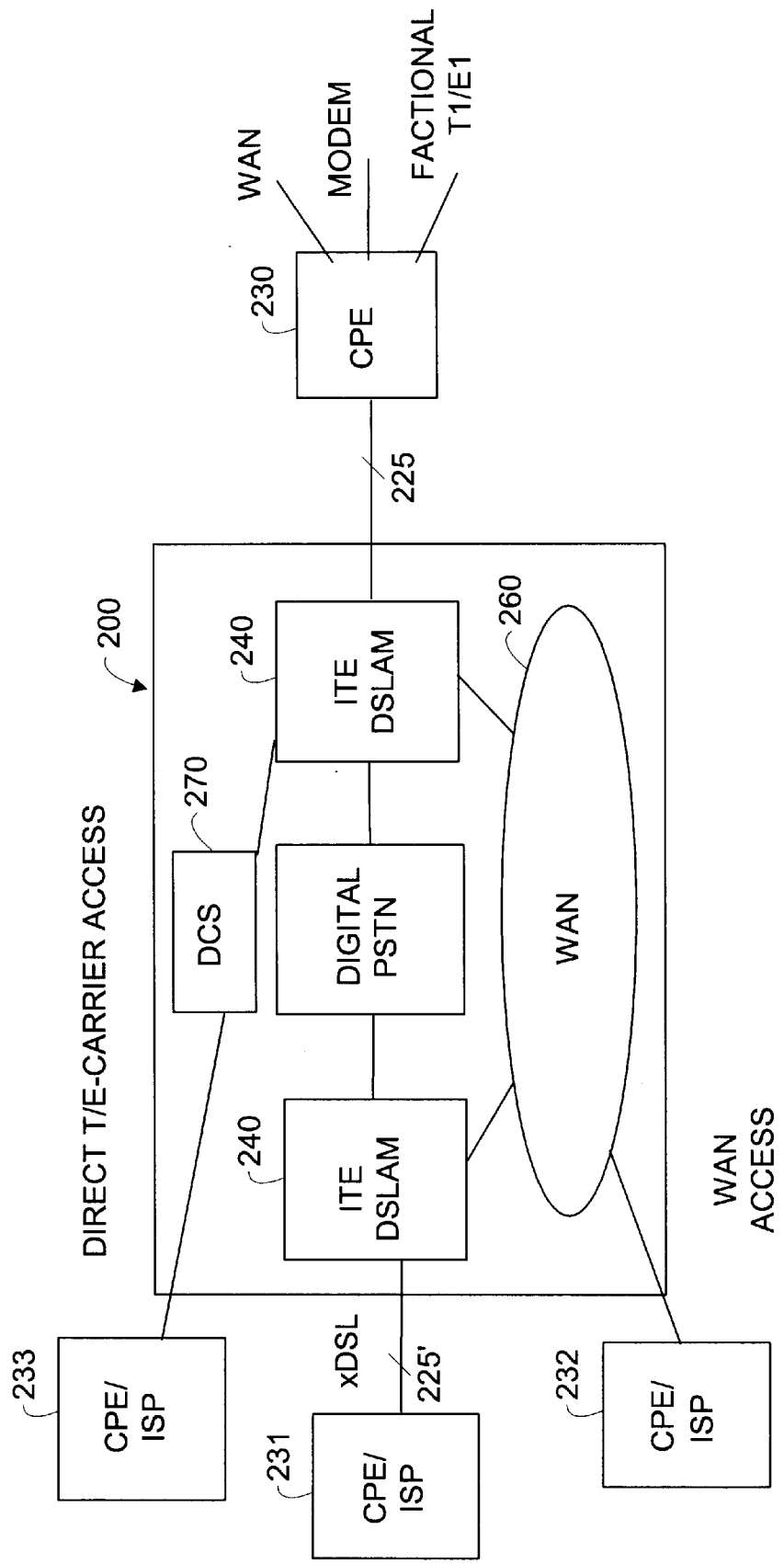
FIG. 2 is an electrical block diagram depiction of a switching network constructed in accordance with the teachings of the present DSLAM invention

FIG. 2 illustrates the new overall end-to-end DSL access switching network 200 proposed by the applicants. The primary highlight of the present invention is an improved DSLAM 240, which provides connection of a DSL line 225 to all data paths within the switching network 200, including PSTN 250, WAN 260, and various digital cross-connects (DCS) 270. Except where noted, DSL line 225, PSTN 250, WAN 260, and CPE/ISPs 230, 231, 232, 233 etc., correspond generally to their well-known counterparts already discussed in connection with FIGS. 1A and 1B.

As described herein, the circuitry of DSLAM 240 effectuates the following operational characteristics:

(1) A high speed DSL line 225 can be connected to PSTN 250, WAN 260, and DCS 270 at the same time by splitting its data stream according to user requirements and available connections;

(2) An end-to-end circuit-switching link between downstream CPE 230 and remote CPEs 231, 232, 233 can be established by connecting multiple 64 kb/s lines through PSTN 250. The total speed can be increased as the DSL line speed increases, and as the user at CPE 230 desires to augment data rate capacity. This capability provides satisfactory connections for time-sensitive services such as video conferencing.

(3) When the PSTN data route is used (i.e., using a direct switched connection through PSTN 250), users can operate the DSL line 225 as is done with current conventional modem usages. The primary difference using the present invention is a higher speed line. This minimizes the effort for users to upgrade to xDSL by avoiding unnecessary network setups.

(4) When the WAN route is used (i.e., using a packet switched connection through WAN 260), users can operate the DSL line either as the current modem use with new invented DSLAM features to be described shortly, or as a virtual connection through standard packet switching setup protocols.

(5) Multiple access protocols are supported over the same DSLAM interface 240, which provides gateway functions to route DSL traffic to either PSTN 250 which is circuit-switched or WAN 260 which is based on Frame Relay, ATM, etc.

(6) Depending on the cost of access through the PSTN 250 and WAN 260, users can select the most economic connection at the given data rate and the service requirement. For example, when users need only 128 kb/s transmission, it would be more cost-effective to use the PSTN 250 than WAN 260. On the other hand, for very high-speed data transmission, it would be more cost effective to use the WAN 260 for its bandwidth sharing nature.

(7) When the present invention is further integrated with a SAM type downstream transceiver at the CPE, users can start with a lower data rate (several hundred bits/sec) access and then increase it as needed.

Figure 3:
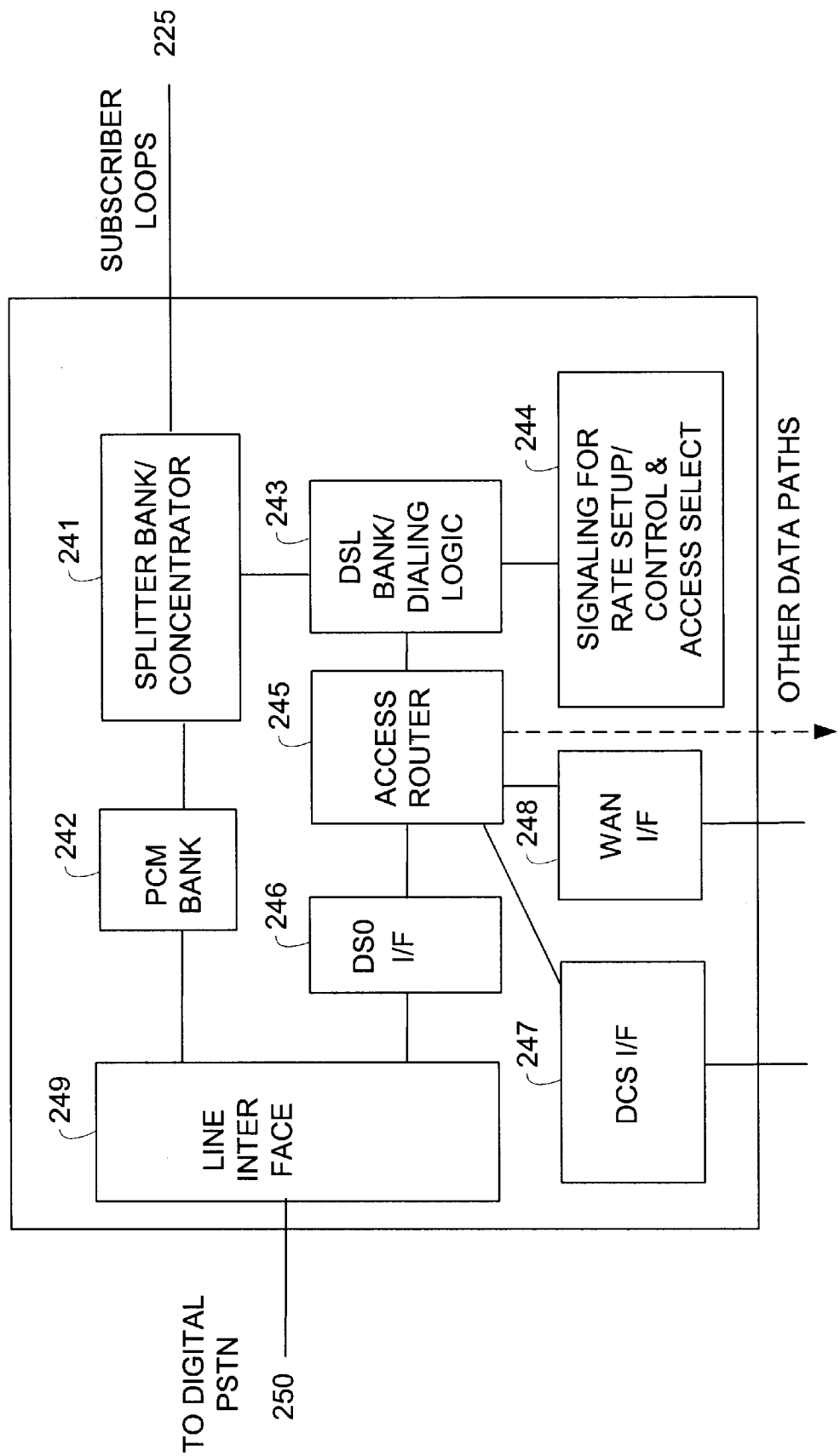
FIG. 3 is an electrical block diagram of a DSL Access and Multiplex (DSLAM) circuit implemented using the teachings of the present invention

A detailed block diagram of the DSLAM 240 architecture is shown in FIG. 3. Splitter Bank/Concentrator circuit 241 interfaces to a number of subscriber loops 225 which concentrates and then splits the physical signals on such loops to (1) a PCM bank 242 for voice calls or analog modem connections and (2) to a DSL Bank/Dialing logic block 243 for DSL access. By concentrating the subscriber loops 225, the number of PCM and DSL codecs in stages 242, 243 can be reduced. PCM Bank 242 in the DSLAM is unique to the present invention, and is not used in any prior art DSLAM circuits known to the applicants. Instead of forwarding analog voice signals directly to phone switch 250, voice signals are first converted to PCM. This allows either T or E-carrier interface to switch 250, which increases the cost effectiveness and permits a standard interface to a digital switch.

DSL Bank/Dialing Logic circuit 243, depending on the DSL codec being used, converts DSL signals to digital data signals that can be routed to the various data paths described below. This circuit also provides the necessary processing during call setup and tear down (both discussed in more detail below). Signaling for Rate Setup/Control and Access Select circuit 244, based on the signaling exchanged with remote site 230, controls Access Router 245 and determine how the user data stream will be routed. For example, it negotiates the final data rate with the remote user, and decides the connection method (dialing up the destination as current modem use via either the PSTN 250 or WAN 260, or setting up a virtual circuit via the WAN). Access Router stage 245 routes the data streams to three main possible routes: DSO interface 246, DCS interface 247, and WAN interface 248. In this manner, a single DSL connection can be connected to multiple routes at the same time. DSO Interface circuit 246 converts DSL bit streams into multiple B-channels (called DSO in digital telephone networks) and multiplexes them to either T or E-carrier signals, which are then connected to the PSTN via Line Interface 249. WAN Interface 248 provides the interface between DSL data streams and WAN 260. DCS Interface 247 provides the interface between DSL data streams and DCS for virtually permanent T or E-carrier connections. By virtually permanent it is meant that a circuit connection is set up by provision instead of user-dial-up. As with PCM Bank 242, the Access Router 245, Access Select 244, DSO Interface 246, and DCS interface 247 are unique aspects to the present DSLAM 240 invention.

Given the description above, the general design of the various stages within the new DSLAM circuit 240 required to accomplish the above functions is a routine task well within the abilities of one skilled in the art. The specifics of such implementation are not critical or essential to the present inventions, and will vary from application to application according to system designer requirements.

The novel DSLAM architecture described, combined with DSL connections, can provide the following service needs:
(1) End-to-end dialing via circuit switching. This is attractive for low bit rate DSL access when used with a downstream SAM architecture at CPE 230, as disclosed in the aforementioned applications noted above, or for time sensitive services such as video conferencing.

(2) End-to-end dialing via packet switching. This data path is most attractive for remote access users do not need real-time services or need very high data (bit) rates.

(3) Access to WAN 260 for high speed, but non-time sensitive services such as Internet access. This type of connection is attractive for users having a network access model, rather than a modem access model at their particular CPE access site.

(4) Virtual permanent connections for corporate users. This feature permits connections by users (usually corporations) whose destination sties can be accessed via T or E class carrier services. The DSLAM architecture described above is a superset of current prior art DSLAM implementation. In other words, the architecture supports all the necessary functions of current prior art DSLAMs, and is therefore backward compatible with existing systems using DSLAMs. Depending on cost constraints, DSLAM 240 can also be implemented without including the features and advantages conferred by some stages such as DCS interface 247 and DSO interface 246. Again, this flexibility permits carriers to build systems that are more specifically tailored to their particular cost/functionality targets.

Signaling and Call Setups for End-to-End Connections Using the Present Invention A description of how the present invention can be used to negotiate rate and establish end-to-end connections for both circuit-switching and packet-switching now follows.

Figure 4A:
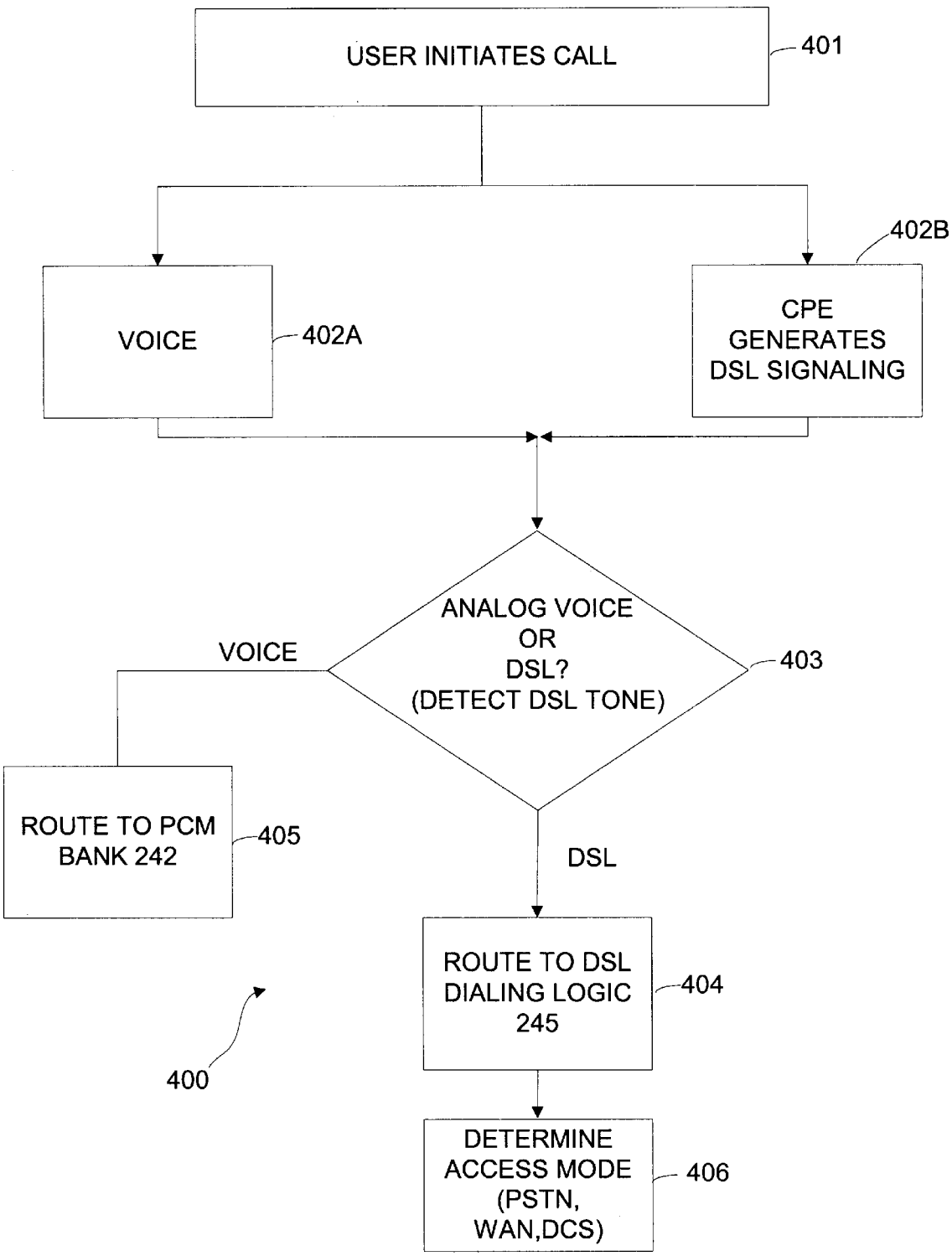
FIG. 4A is a flow chart illustrating an access setup process for setting up an end-to-end connection through either a PSTN, DCS or WAN in accordance with the present disclosure.

The initial DSLAM access procedures are described first with reference to the flowchart shown in FIG. 4A.

At step 401, a remote user at CPE 230 calls a central office site over its DSL 225, initiating either a voice connection at 402A, or a DSL connection at 402B. If it is a DSL access, a DSL signal (which can be arbitrarily specified) from the remote DSL unit 230 is generated at step 402B. DSLAM 245 then determines at step 403 whether the call is an analog voice signal or a request for DSL access by detecting the presence of the specified DSL signal. If it is a DSL call, at step 404 DSLAM 245 routes the DSL data to DSL Bank/Dialing Logic circuit 243. If it is the DSL signal is not detected, DSLAM 245 instead connects the analog voice signal to PCM bank 242 at step 405.

After the DSL signal is connected to DSLAM 240, route selection signaling is sent by the caller at 230 over the DSL carrier and received by DSLAM 240 to direct Access Router 245 at step 406 to select a particular access mode (i.e. PSTN 250, DCS 270, or WAN 270).

The above is merely illustrative of a preferred embodiment of performing the access process between the DSLAM 240 and remote user site 230. Other suitable variations will be apparent to skilled artisans given the teachings herein. Again, while this embodiment of the present invention is set out in the context of a DSL based application, it will be apparent to those skilled in the art that above description is merely an exemplary implementation. In addition, there may be other types of data path routes connectable through the DSLAM of the present invention which require data handling other than the circuit and/or packet switching capabilities of PSTN 250 and WAN 260, respectively.

Figure 4B:
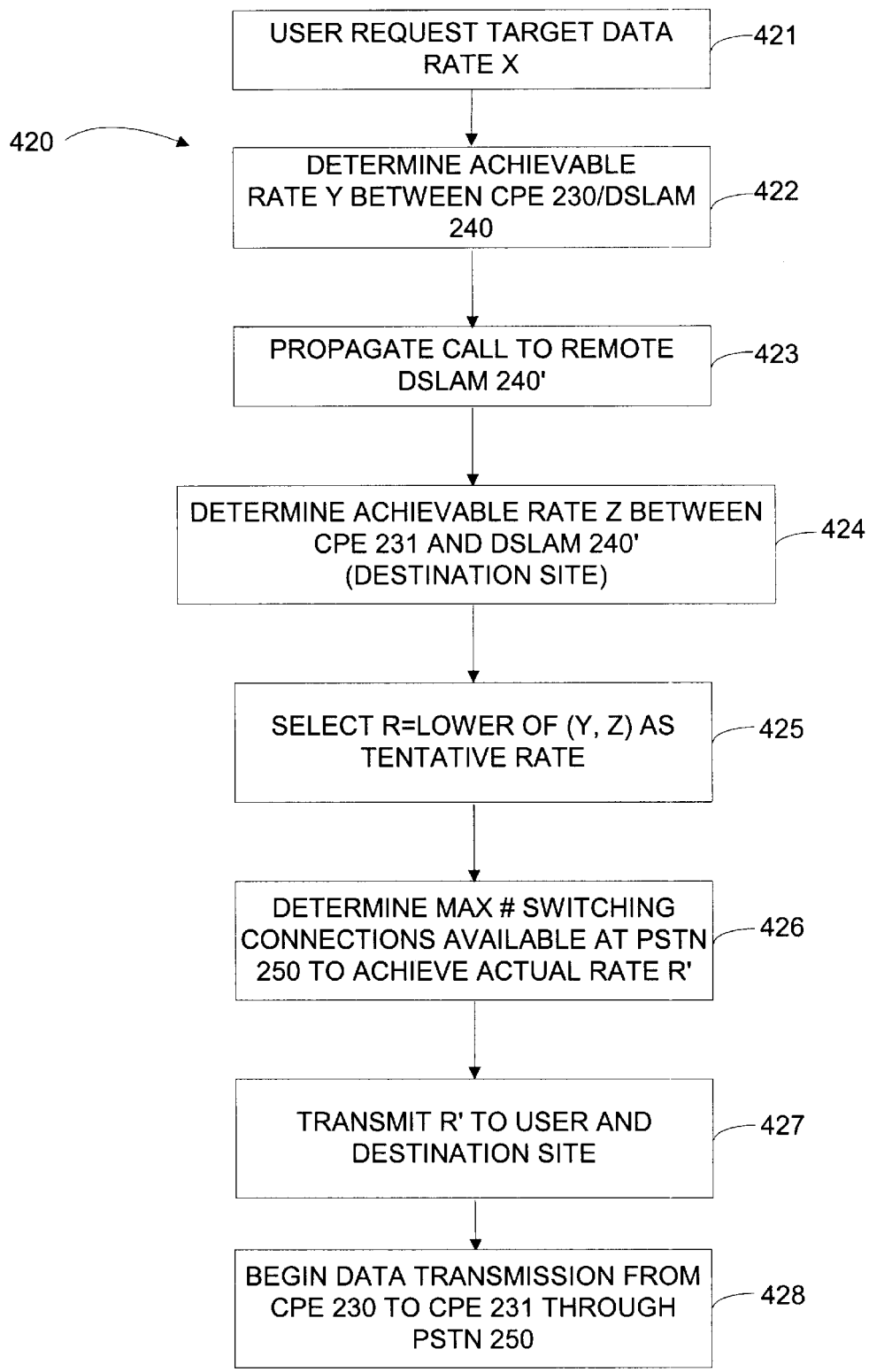
FIG. 4B is a flow chart illustrating a call setup process for setting up an end-to-end connection through the PSTN in accordance with the present disclosure.

A further description of the various call setup process for each of these modes now follows with reference to the flowcharts at FIGS. 4B–4D.

End to End Switching Through PSTN 250

With reference to FIG. 4B, assuming the user has opted for a routing through PSTN 250, the PSTN call setup process 420 can be used to connect an end-to-end circuit via the PSTN 250 and at a rate of multiple of 64 kb/s. Such routing might be requested, for example, where data transfer is time sensitive and requires real time performance circuit-switching connections. It should be appreciated by those skilled in the art that the 64 kb/s figure is merely typical of that used by central offices at this time, and the present invention is not restricted to such specific adaptations.

(1) At step 421, the user first decides and requests a target data rate X (multiple of 64 kb/s).

(2) The DSL codecs at CPE 231 and DSLAM 245 then decide the available rate Y (Y<=X) at step 422 for DSL 225 by taking into consideration, among other things, the caller requested target rate, line quality of DSL 225, etc.

(3) During step 423, the call request is propagated to the remote CO associated with destination site CPE 231 where at step 424, DSLAM 240' of the remote CO then calls the DSL of the called party and performs similar rate negotiation process of the above step 422 to determine an available rate Z on DSL, 225'.

(4) Depending on the result of step 424, DSLAM 240 then selects R as the lower of Y and Z at step 425 as the tentative achievable rate for the overall data link.

(5) At step 426, PSTN 250 then allocates and sets up multiple 64 kb/s connections to try and satisfy the above data rate R. However, the maximum number of switching circuits that the PSTN can set up determines the final actual available rate, R' that can be used in the link.

(6) The PSTN 250 then sends the final rate to both the calling and called parties at step 427.

(7) After this, at step 428 the end-to-end connection starts to communicate data from user site CPE 230 to destination site 231 through PSTN 250.

End to End Switching Through WAN 260

With reference to FIG. 4C, assuming the user has opted for a routing through WAN 260, the WAN call setup process 430 can be used to connect an end-to-end packet-switching link. Such routing might be requested, for example, where the data transfer is not time sensitive, but requires the current modem-use model.

(1) At step 431, the user first decides and requests a target data rate X.

(2) The DSL codecs at CPE 231 and DSLAM 245 then decide the available rate Y at step 432 for DSL 225 by taking into consideration, among other things, the caller requested target rate, line quality of DSL 225, etc.

(3) During step 433, the call request is propagated to a CO associated with a destination site CPE 231 where at step 434, DSLAM 240' of the remote CO then calls the DSL of the called party and performs similar rate negotiation process of the above step 432 to determine an available rate Z on DSL 225'.

(4) Depending on the result of step 434, DSLAM 240 then selects R as the lower of data rates Y and Z at step 435 as the tentative achievable rate for the overall data link.

(5) At step 436, WAN 260 then allocates and sets up the packet connection by trying to meet the above data rate R. However, the maximum number of packets that the WAN can set up determines the final actual available rate, R' that can be used in the link.

(6) WAN 260 then sends the final rate to both the calling and called parties at step 437.

(7) After this, at step 438, the end-to-end connection starts to communicate data from user site CPE 230 to destination site 232 through WAN 260.

End-to-End Path Through An "Always On" Connection

With reference to FIG. 4D, in this case, the DSL connection 225 to the central office is always on. To start the connection (turn it on initially) DSL transceiver at CPE 231 talks to remote DSLAM 240 at the central office at step 441 and negotiates the target rate Y that can be achieved on DSL 225 based on the loop condition, host processor power at CPE 231, access cost, and the backbone rate support for WAN 260.

Once the DSL connection is on, the end-to-end packet-switching connection is accomplished using process 440 as follows:

(1) The user can set up a Frame Relay or ATM link through WAN 260. The Frame Relay or ATM network first checks if the rate request Y from the new connection is smaller than the available rate X from the WAN. If not, the requested rate Y is reduced to the available rate X, so that the final Z is the lesser of X and Y.

(2) The requested rate Z is passed over WAN 260 to the destination end 232 at step 442, which will check at step 443 if the request rate Z can be supported by either another DSL link or a WAN connection. If not, the request is either rejected or the request rate is reduced to a rate R that can be supported. The final actual rate R used to set up the connection is based on the protocol of the selected network.

(3) After this, at step 443 the end-to-end connection starts to communicate data from user site CPF 230 to destination site 232 through WAN 260.

Although the present invention has been described in terms of a preferred embodiment, it will be apparent to those skilled in the art that many alterations and modifications may be made to such embodiments without departing from the teachings of the present invention. For example, it is apparent that the present invention would be beneficial used in any xDSL or high speed multi-carrier application environment. Other types of circuits beyond those illustrated in the foregoing detailed description can be used suitably with the present invention. Accordingly, it is intended that the all such alterations and modifications be included within the scope and spirit of the invention as defined by the following claims.

What is claimed is:

1. A data route configuration circuit for use in a system capable of establishing an end-to-end data path connection between an originating site and a destination site, said system having access to a first data path having first data transmission characteristics and using circuit switching networks for data transmission, and a second data path having second data transmission characteristics and using packet based networks for data transmission, said circuit including:

a data path routing select circuit which:

(i) processes data route configuration information received from said originating site, said configuration information including a request for establishing a data route to carry a data transmission associated with a wideband multicarrier xDSL signal, and a cost constraint provided by a subscriber; and (ii) determines whether a data route can be set up based on the configuration information, including by dynamically determining an access cost associated with available data paths; and (iii) determines which of said data paths should be used for said data route based on said configuration information, transfer delay requirements of said data transmission, said first and second data transmission characteristics, and by comparing said access cost with said subscriber cost constraints; and a control circuit for establishing and controlling a selected data route implemented using either or both of said first and second data paths; said control circuit further splitting said data transmission such that when said data transmission includes time-sensitive data portions, said time-sensitive portions can be routed, as needed, to said destination site and other destination sites through a number of separate switched channels associated with said first data path, which number is adjusted dynamically based on a bandwidth requirement of said data transmission;

wherein said selected data route for transferring data can be effectuated by said configuration circuit based on the configuration information from said originating site.

2. The circuit of claim 1, wherein said first data path includes a public switched telephone network or a digital cross-connect, said second data path includes a wide area network, and said data transmission from said originating site can be split so that said time-sensitive portions can be transmitted through said first data path while non-time-sensitive portions of said data stream can be transmitted through said second data path.

3. The circuit of claim 1, wherein the data route configuration information can include information for setting up an ADSL based access between said originating site and said data route configuration circuit.

4. The circuit of claim 3, wherein said ADSL based access can be configured such that the data path routing select circuit routes time sensitive data for said ADSL based access, including both subscriber data and subscriber voice signals through said number of independent switching channels associated with said first data path or some other available data path with minimal data transmission delay characteristics.

5. The circuit of claim 3, wherein the data path routing circuit routes non-time sensitive data for said ADSL based access through said second data path which includes a wide area network or some other available data path other than a switched network and/or digital cross-connect.

6. The circuit of claim 1, wherein the data routing configuration information can include information pertaining to a desired target data rate in excess of 128 kb/s, and said data transmission can be set up by routing data from an xDSL access serving the originating site through a conventional PSTN dial-up connection to the destination site.

7. The circuit of claim 6, wherein the data path routing circuit dynamically determines a maximum target data rate of available data paths and sets up said selected data route based on this determination.

8. The circuit of claim 1, wherein the data routing configuration information can include information pertaining to the connection model used at the origination site, including whether such site utilizes a dial-up or always-on connection, and said selected data route is set up in accordance with said connection model.

9. The circuit of claim 1, wherein the data path routing circuit dynamically determines which available data paths are best suited for the connection model used at the origination site, and said selected data route is set up in accordance with said connection model.

10. The circuit of claim 1, wherein the origination site can be coupled to said configuration circuit through a digital subscriber loop (DSL) where a reduced data rate is set up to support an ADSL data link having a bandwidth that is intentionally reduced from that of a full rate ADSL data link.

11. The circuit of claim 1, further including a pulse code modulation circuit for converting voice signals from the originating site into digital voice signals for routing such signals through a digital circuit switched network or another data path having minimal data transmission delay characteristics.

12. The circuit of claim 1, further including: (i) a switched network interface circuit adapted to route a broadband xDSL data stream through multiple B channels in a public switched telephone network; (ii) a wide area network interface circuit adapted to route said broadband xDSL data stream through a packet based network; and (iii) a digital cross-connect interface circuit adapted to route said broadband xDSL data stream through a virtually permanent T or E-carrier connection, all of which are coupled to the control circuit.

13. The circuit of claim 2, wherein the WAN can be selected for setting up a high speed data link in excess of 128 Kb/s and such WAN is used to transport xDSL data from an always-on ADSL service.

14. The circuit of claim 13, wherein the WAN optionally transfers data using any or all of the following packet switching networks: (i) frame relay; and (ii) asynchronous transfer mode (ATM).

15. The circuit of claim 2, wherein a public switched telephone network (PSTN) can be selected to transfer time sensitive data, including data associated with an xDSL data service, by setting up one or more dedicated 64 Kb/s links, which links are maintained only for the duration of time required to transfer time sensitive data.

16. The circuit of claim 1, wherein the first and second data transmission characteristics for said first and second data paths include any one or more of the following:

(a) availability of such data path; and/or (b) cost per unit of transmission bandwidth of such data path; and/or (c) data transfer rates achievable using such data path; and/or (d) data transfer delays of such data path.

17. The circuit of claim 16 wherein the configuration information includes information pertaining to a desired data transmission cost, and the configuration circuit can set up either of said first path or second data paths as said selected data route based on the desired data transmission cost and data transmission availability of said data paths.

18. The circuit of claim 17, wherein the configuration information includes information pertaining to a desired data transmission rate, and the configuration circuit can set up either of said first path or second data paths as said selected data route based on the desired data transmission rate of said data paths.

19. The circuit of claim 18, wherein said connection configuration information includes information pertaining to a desired data transmission connection model, and the setup circuit can set up either of said first path or second data paths as said data path connection based on the desired data transmission connection model and data transmission availability of said data paths.

20. A configuration circuit for configuring an end-to-end data connection between an originating site and a destination site, said configuration circuit including:

a DSL coupling circuit for receiving a wideband xDSL based data signal and data route configuration information from a subscriber;

a data path routing select circuit which:

(i) processes said data route configuration information received from said originating site, said configuration information including a request for establishing a data path, and a cost constraint provided by said subscriber; and (ii) communicates with said destination site and determines whether a data path can be set up based on the configuration information; and (iii) selects which one or more of a plurality of available data paths should be used in said end-to-end data connection, based on the configuration information and data transmission characteristics of the available data paths, the data transmission characteristics including any one or more of the following parameters: (a) an access cost, including cost per unit of transmission bandwidth of such data path; and/or (b) data transfer rates achievable using such data path; and/or (c) data transfer delays of such data path; said data path routing select circuit being further configured to compare said access cost with said subscriber cost constraint; and a control circuit for establishing and controlling any selected data path; and an interface circuit for converting said xDSL data signal into a format suitable for transmission through one or more first data paths including through one or more switched circuits when said xDSL data signal includes time sensitive data.

21. The circuit of claim 20, wherein the data paths include said first data paths consisting of a switched network or a digital cross-connect for implementing said one or more switched circuits, a second data path consisting of a wide area network, and data in said xDSL signal from said originating site can be split so that portions containing said time-sensitive data can be transmitted through said one or more first data paths while portions containing non-time-senstive data of said data stream can be transmitted through either said first or second data paths.

22. The circuit of claim 20, wherein the data route configuration information can include information for setting up an ADSL based access between said originating site and said configuration circuit.

23. The circuit of claim 22, wherein said ADSL based access can be configured such that the data path routing circuit routes time sensitive data for said ADSL based access, including both data and voice signals through said one or more first data paths.

24. The circuit of claim 20, wherein the origination site can be coupled to said configuration circuit through a digital subscriber loop (DSL), where a reduced data rate is set up to support an ADSL data link having a bandwidth that is intentionally reduced from that of a fall rate ADSL data link.

25. The circuit of claim 20, further including a pulse code modulation circuit for converting voice signals from the originating site into digital voice signals for routing such signals through said one or more first data paths or another data path having minimal data transmission delay characteristics.

26. The circuit of claim 20, further including: (i) a switched network interface circuit adapted to route a broadband xDSL data stream through multiple B channels in a public switched telephone network; (ii) a wide area network interface circuit adapted to route said broadband xDSL data stream through a packet based network; and (iii) a digital cross-connect interface circuit adapted to route said broadband xDSL data stream through a virtually permanent T or E-carrier connection, all of which are coupled to the control circuit.

27. The circuit of claim 21, wherein the WAN can be selected for setting up a high speed data link in excess of 128 Kb/s and such WAN is used to transport xDSL data from an always-on ADSL service.

28. The circuit of claim 27, wherein the WAN optionally transfers data using any or all of the following packet switching networks: (i) frame relay; and/or (ii) asynchronous transfer mode (ATM).

29. The circuit of claim 21, wherein a public switched telephone network (PSTN) can be selected to transfer time sensitive data, including data associated with an xDSL data service by setting up one or more dedicated 64 Kb/s links which links are maintained only for the duration of time required to transfer time sensitive data.

30. A data path setup circuit for accessing and configuring an end-to-end data route between an originating site and a destination site based on an access request, said setup circuit including:

a selection circuit for dynamically evaluating and selecting either or both of a first and second data path based on the availabilty and data transmission characteristics of such data paths, including an associated access cost for such data paths, a cost constraint provided by said subscriber, and time delay sensitivity of data signals and voice signals carried in a wideband xDSL data signal received from the originating site;

wherein said selection circuit compares said associated access cost for such data paths to said cost constraint; and a control circuit for establishing and controlling any selected data path for said data signals and voice signals, such that said end-to-end data route can be effectuated using such selected path;

an interface circuit for converting said xDSL data signal into a format suitable for transmission through said selected path, such that said first data path can be used for portions of said xDSL data signal including time delay sensitive data, and/or said second data path can be used for portions of said xDSL signal not including time delay sensitive data;

wherein the data transmission characteristics can include any one or more of the following parameters: (a) cost per unit of transmission bandwidth of such data path; and/or (b) data transfer rates achievable using such data path; and/or (c) data transfer delays of such data path.

31. The circuit of claim 30, wherein the first data path consists of a switched network or a digital cross-connect for implementing one or more switched circuits, a said second data path consists of a wide area network.

32. The circuit of claim 30, wherein a circuit switched network, a digital cross-connect, or some other available data path with minimal data transmission delay characteristics is used for all portions of said xDSL data signal containing time delay sensitive data transmissions.

33. The circuit of claim 30, wherein the origination site can be coupled to said data path setup circuit through a digital subscriber loop (DSL), where a reduced data rate is set up to support an ADSL data link having a bandwidth that is intentionally reduced from that of a fall rate ADSL data link.

34. The circuit of claim 30, further including a pulse code modulation circuit for converting voice signals from the originating site into digital voice signals for routing such signals through a circuit switched network or another data path having minimal data transmission delay characteristics.

35. The circuit of claim 30, further including: (i) a switched network interface circuit adapted to route a broadband xDSL data stream through multiple B channels in a public switched telephone network; (ii) a wide area network interface circuit adapted to route said broadband xDSL data stream through a packet based network; and (iii) a digital cross-connect interface circuit adapted to route said broadband xDSL data stream through a virtually permanent T or E-carrier connection, all of which are coupled to the control circuit.

36. The circuit of claim 31, wherein the WAN can be selected for setting up a high speed data link in excess of 128 Kb/s and such WAN is used to transport xDSL data from an always-on ADSL service.

37. The circuit of claim 36, wherein the WAN optionally transfers data using any or all of the following: packet switching, frame relay, and asynchronous transfer mode (ATM).

38. The circuit of claim 31, wherein a public switched telephone network (PSTN) can be selected to transfer time sensitive data, including data associated with an xDSL data service, by setting up one or more dedicated 64 Kb/s links, which links are maintained only for the duration of time required to transfer time sensitive data.

39. The circuit of claim 31, wherein the data transfer rates are determined by evaluating a number of separate data links constituting said data route, including a digital subscriber loop connected to said origination and destination sites respectively.

40. A system for supporting communications service to a subscriber on a digital subscriber loop, the service utilizing a wideband xDSL multi-carrier signal for communicating an xDSL data stream, the system comprising:
   an xDSL interface circuit for receiving said xDSL multi-carrier signal as well as subscriber access mode information relating to whether said xDSL data stream includes time delay sensitive data, as well as a subscriber cost constraint; and
   an access select circuit for processing said access mode information and determining a selected data path for said xDSL data stream as well as a transmission bandwidth required for said selected data path, said access select circuit being configured to dynamically determine an access cost for transmitting said xDSL data stream, and being further configured to compare said access cost with said subscriber cost constraint when determining said selected data path; and
   an access routing circuit for routing data of the xDSL data stream to said selected data path and using said transmission bandwidth, which selected data path can include a circuit switched network and/or a packet switched network;
   wherein for any particular data transmission, a subscriber can select and access said transmission bandwidth, as well as which portions, if any, of said xDSL data stream are to be carried on said circuit switched network, and which remaining portions of said xDSL data stream, if any, are to be carried on said packet switched network.

41. The system of claim 40 wherein said system further sets up said circuit switched network to carry digital voice signals from said digital subscriber loop, which digital voice signals are based on pulse code modulated subscriber voice signals.

42. The system of claim 40, wherein said subscriber can configure said system to support any time delay sensitive data in portions of said xDSL data stream using switched circuit transmission bandwidth of only said switched circuit network, and which switched circuit transmission bandwidth can be accessed and used by said subscriber only as needed to support said time delay sensitive data.

43. The system of claim 42, wherein said xDSL data stream is based on an xDSL multi-carrier signal that has a signal bandwidth intentionally reduced from that of a full rate xDSL multi-carrier signal supportable in the digital subscriber loop, so that said subscriber need only access switched circuit transmission bandwidth sufficient to meet such reduced signal bandwidth.

44. The system of claim 39, wherein subscriber data signals and voice signals are simultaneously routed through said circuit switched network.

45. The system of claim 39, wherein said xDSL data stream utilizes a first number of switched B channel connections through a PSTN, and as a data rate for said xDSL data stream increases, said system augments transmission bandwidth by adding a second number of switched B channels used for carrying said xDSL data stream, so that said first and second number of switched B channels are only accessed as need by said digital subscriber loop to carry said xDSL data stream.

46. A system for operating a communications service based on a wideband xDSL multi-carrier signal carried in a digital subscriber loop, the system comprising:
   an xDSL interface circuit for receiving said xDSL multi-carrier signal as well as subscriber access mode requirement information identifying subscriber cost constraints for transporting said xDSL data stream;
   an access select circuit for processing said subscriber access mode requirement information and determining a selected data path for said xDSL data stream by evaluating access cost characteristics of available data paths, which available data paths can include a circuit switched network and/or a packet switched network, said access select circuit further being configured to compare said subscriber cost constraints and said access cost characteristics when determining said selected data path; and
   wherein said xDSL data stream is transported using one or more of said available data paths that have access cost characteristics satisfying said subscriber cost constraints.

47. The system of claim 46, wherein said subscriber access mode requirement information also includes user connection model constraints that must be met by said selected data path, including a type of connection model which must be supported by said selected data path.

48. The system of claim 46, wherein said communications service only accesses and uses bandwidth in said circuit switched network as needed to support for any particular xDSL data stream, said bandwidth not being dedicated to said digital subscriber loop.

49. The system of claim 46, wherein subscriber data signals and voice signals are simultaneously routed across said digital subscriber loop through said circuit switched network.

50. A method of operating a digital subscriber loop (DSL) that utilizes a wideband multi-carrier signal for communicating with a subscriber, the method including the steps of:
   (a) receiving a data transmission including both subscriber voice signals and subscriber data signals simultaneously from the subscriber through the DSL;
   (b) processing access mode requirement information from the subscriber for said data transmission, which access mode requirement information identifies whether said data transmission includes time delay sensitive data, as well as a cost constraint for said data transmission, and which access mode requirement information can be changed by the subscriber, as desired, for any particular data transmission through the DSL;

(c) evaluating available data paths for transporting said data transmission based on said access mode requirement information, which available data paths include a circuit switched network and/or a packet switched network, said evaluating including determining one or more access costs associated with said available data paths; and (d) selecting one or more of said available data paths for said data transmission depending on which of said available data paths best matches said access mode requirement information, said selecting being based in part on comparing said cost constraint with said one or more access costs, and said selecting being done such that time delay sensitive data in said data transmission is transported using a data path that is capable of meeting transmission time requirements of said time delay sensitive data;

(e) configuring an access circuit based on the results of step (d), so that said data transmission can be routed to said one or more selected data paths.

51. The method of claim 50 wherein including a step of pulse code modulating said subscriber voice signals before said signals are transported through said one or more selected data paths.

52. The method of claim 50, wherein time delay sensitive data in portions of said data transmission is carried using switched circuit transmission bandwidth of only said switched circuit network, and which switched circuit transmission bandwidth can be accessed and used only as needed to support said time delay sensitive data.

53. The method of claim 50, wherein said data transmission is based on an xDSL multi-carrier signal that has a signal bandwidth intentionally reduced from that of a full rate xDSL multi-carrier signal supportable in the digital subscriber loop, so that only switched circuit transmission bandwidth sufficient to meet such reduced signal bandwidth is accessed for said reduced xDSL multi-carrier signal.

54. The method of claim 50, wherein said data transmission utilizes a first number of switched B channel connections through a PSTN, and as a data rate for said data transmission increases, transmission bandwidth is augmented by adding a second number of switched B channels for carrying said data transmission, such that said first and second number of switched B channels are only accessed as need by said digital subscriber loop to carry said data transmission.

55. A method of routing a data transmission to a destination site, including subscriber voice and subscriber data received from a subscriber as part of a wideband ADSL multi-carrier signal through a digital subscriber loop (DSL), the method including the steps of:

(a) identifying which portions, if any of said data transmission are time delay sensitive portions containing time delay sensitive data, as well as which portions, if any, of said data transmission are non-time delay sensitive portions;

(b) considering a cost constraint provided by the subscriber for said data transmission;

(c) determining an access cost associated with one or more separate data connections that could carry said data transmission;

(d) comparing said access cost with said cost constraint to identify a potential set of data connections for carrying said data transmission;

(e) splitting said data transmission so that: (i) said time delay sensitive portions are transported to the destination site through a first set of said one or more potential set of data connections, that are capable of meeting transmission time requirements of said time delay sensitive portions, including, if necessary, through a public switched telephone network; (ii) said non-time delay sensitive portions are routed to the destination site through a second set of said one or more potential set of data connections that best satisfy a subscriber's access request for transporting said non-time delay sensitive portions;

wherein a subscriber can configure an end to end connection path used for carrying an ADSL data signal between said subscriber and the destination site, so that a controllable portion of said data transmission in the wideband ADSL multi-carrier signal can be transported through said public switched telephone network.

56. The method of claim 55, wherein said time delay sensitive portions are transported through said public switched telephone network by setting up a number of independent switched 64 kb/s access channels sufficient to satisfy data rate requirements of said time delay sensitive portions.

57. The method of claim 56, wherein, as a data rate for said data transmission increases, an additional one or more independent switched 64 kb/s access channels can be configured as part of said end to end connection path to achieve sufficient bandwidth for transporting said data transmission.

58. The method of claim 55 wherein said time delay sensitive portions include at least voice signals and video based signals.

* * * * *